V. W. GOULD & C. P. FIELD.
TANK OUTLET.
APPLICATION FILED FEB. 20, 1913.
1,086,663.
Patented Feb. 10, 1914.
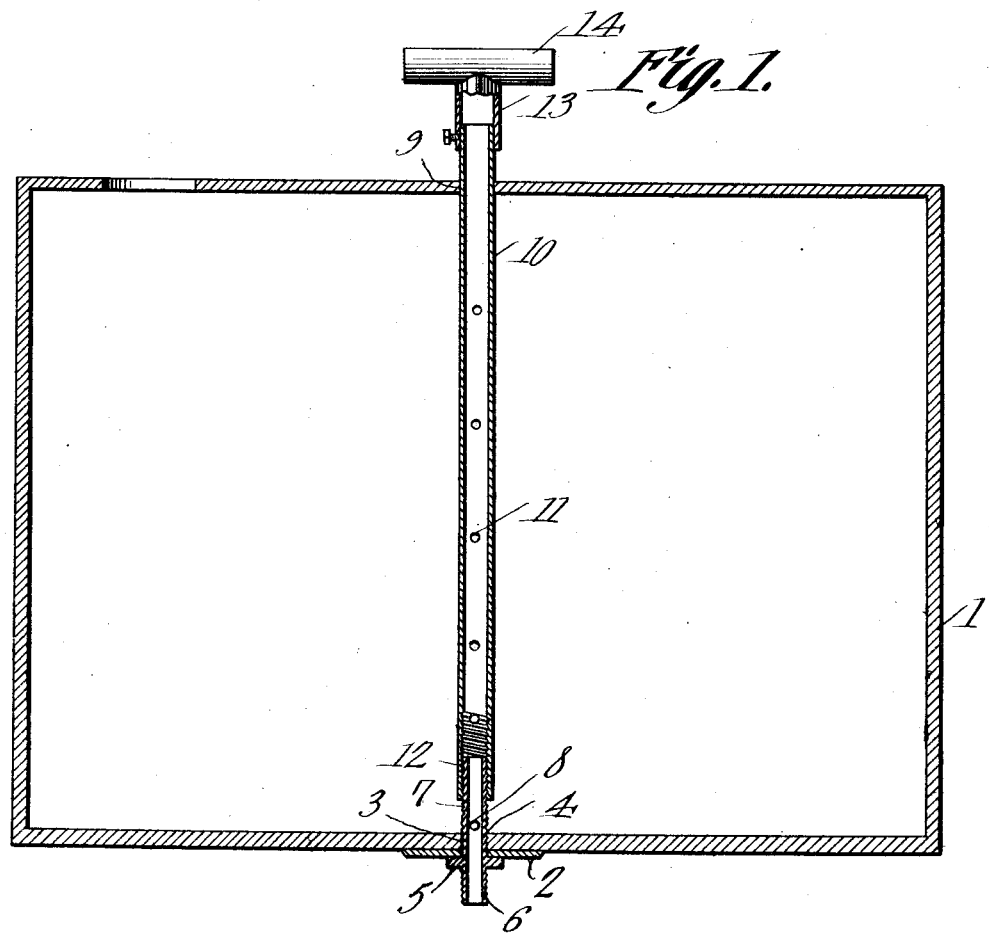
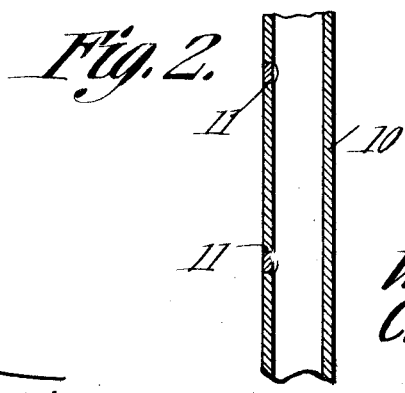

UNITED STATES PATENT OFFICE.

VINCENT WARD GOULD AND CHARLES P. FIELD, OF DE LAND, FLORIDA.

TANK-OUTLET.

1,086,663.  Specification of Letters Patent.   Patented Feb. 10, 1914.

Application filed February 20, 1913. Serial No. 749,755.

*To all whom it may concern:*

Be it known that we, VINCENT W. GOULD and CHARLES P. FIELD, citizens of the United States, residing at De Land, in the county of Volusia, State of Florida, have invented a new and useful Tank-Outlet, of which the following is a specification.

This invention relates to an outlet for a tank and more particularly to a device whereby the liquid contents of a tank may be drained to a predetermined level and the remaining portion therein may then be drained by the manual turning of a particularly designed valve.

An object of the present invention is to provide a device to be used in connection with the gasolene tank of an automobile with an outlet therefor so designed that the gasolene from the tank may be used until a predetermined level thereof is reached. When this level is reached the gasolene from the tank will cease to flow and the operator will therefore be warned that the supply of liquid fuel is low and should be replenished. In order that the remaining portion of fuel in the tank may be used, the operator is compelled to turn a handle located at the top of the tank after which the entire tank may be exhausted.

A further object is to provide a device of the class described in which the various parts will be simple in construction and cheap to manufacture.

A further object is to provide and so arrange the parts that they may be installed upon tanks already in service without requiring any changes thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the drawings accompanying this specification and forming a part thereof, the preferable form of our invention is illustrated, in which:—

Figure 1 is a vertical sectional view of a liquid fuel supply tank with our improved outlet valve installed therein. Fig. 2 is a fragmental view of the tube showing the manner in which the holes therein are sealed and any number of which may be opened according to the desires of the purchaser.

Referring to the drawings in which similar reference characters designate corresponding parts throughout the several views, 1 is a liquid fuel tank and is provided with an inlet opening at the top thereof for the introduction of the liquid which the tank is designed to hold. The bottom of the tank is provided with a reinforcing plate 2 and through which plate 2 and the bottom wall of the tank extends the threaded aperture or opening 3. A nipple generally designated by the numeral 4 is provided with an upper threaded portion 7 which extends through and in threaded engagement with the bottom wall of the tank. The nipple is formed with a wrench engaging portion or nut 5 which is adapted to contact with the lower surface of the reinforcing plate 2 and to thereby provide a shoulder or stop against which the nipple may be forced. The lower portion of the nipple is provided with suitable threads 6 to which is connected the fuel outlet pipe which will generally communicate with the carbureter of the automobile. The upper portion 7 of the nipple extends a short distance above the bottom of the tank and is provided with an aperture 8 therein which is so positioned with relation to the nut shoulder 5 and the thickness of the tank wall and reinforcing plate that the lower edge of the opening will lie in substantial alinement with the bottom of the tank, the purpose being that when the said aperture 8 is exposed or open that the liquid contained within the tank 1 may be completely drained therefrom through the aperture 8 and the nipple 4 which is hollow throughout.

The top wall of the tank 1 is provided with a circular aperture 9 therein which lies above and in alinement with the aperture 3 in the bottom of the tank. Extending through the aperture 9 is the long hollow tube 10 which is provided with a number of apertures 11 in the side walls thereof. The lower extremity of the tube 10 is internally threaded as at 12 and is adapted to fit over and engage the upper portion 7 of the nipple 4. The purpose of the tube 10 is to fit over the portion 7 of the nipple and to thereby close the aperture 8. In order that the tube 10 may be rotated, the sleeve 13 is provided with a handle 14 thereabove and suitable means whereby the said sleeve may grip the upper portion of the tube 10, from which it will be apparent that the handle 14 may be gripped and manually rotated with the result that the tube 10 will be forced downward over the aperture 8 for the closing thereof or upward for the exposing of said aperture.

From the foregoing it will be apparent that when this device is installed upon a gasolene tank such as is used in connection with automobiles that the tube 10 is to be screwed down over and closing the opening 8 of the nipple. The tank 1 is then filled with a suitable quantity of liquid fuel which passes through the openings 11 of the tube and flows downwardly therethrough and through the nipple 4 into the fuel supply pipe. The liquid fuel may then be used until such time that the level thereof reaches the lowermost of the openings 11 of the tube. When said level is reached, the fuel will no longer flow into the supply tube and warning will thereby be given to the operator that the level of the liquid fuel in the tank has become low and that only a limited quantity of fuel remains therein. By the rotation of the tube 10 the opening 8 may be exposed and the remaining portion of the fuel may be drained from the tank and used, from which it will be apparent that a certain amount of fuel will always be available in the tank whereby the automobile may be driven to the nearest fuel supply station and the tank replenished.

While the foregoing describes our improved valve outlet for tanks in connection with gasolene tanks for automobiles it will be readily apparent that the same may be used for other purposes such as for instance when the amount of liquid in a tank is desired to be lowered to a predetermined level or when a quantity of the liquid in the tank is desired to be used and a certain auxiliary or emergency amount left therein.

A reference to Fig. 2 shows the apertures 11 in the tube 10 sealed or closed by means of some soft substance such as solder the object being that the user may open as many of these apertures as he desires and that the auxiliary amount of fuel left in the tank before the opening 8 is exposed may thereby be varied.

The various parts are extremely simple and may be easily and cheaply manufactured. Suitable gauze or strainer may be introduced within the nipple or tube for the prevention of foreign matter passing therethrough.

Having thus fully described our invention what we claim to be new and original with us is:—

1. An apparatus of the class described, comprising a tank, a nipple extending through the bottom of the tank and terminating thereabove, said nipple provided with an opening in the side wall thereof juxtaposed the bottom of the said tank, a tube provided with a plurality of spaced openings engaging the said nipple and adapted to close the opening therein, and means disposed within said tube openings for the sealing thereof, said means of such a character as to be readily removed therefrom.

2. In a reserve supply device, the combination of a tank provided with an opening in the bottom thereof, a threaded nipple extending therethrough and in engagement therewith, said nipple provided with an opening in the side wall thereof in substantial alinement with the bottom of the tank, a tube extending through the top wall of the tank and threadedly engaging the said nipple, said tube provided with a plurality of openings therein, a soft sealing substance disposed within said openings for the closure thereof and readily removable therefrom, the said tube extending down over and adapted to close the opening in the side wall of said nipple, the lower extremity of said tube adapted to forcibly engage the bottom of said tank and to effect a liquid tight joint therewith, said tube adapted to be entirely disengaged from said nipple for the withdrawal of the tube from said tank, providing for the exposure of said tube for a cleaning thereof and allowing for the sealing and opening of said tube openings.

3. An apparatus of the class described comprising a tank provided with an outlet leading through the bottom thereof, a tube adapted to close said outlet opening, said tube provided with a plurality of spaced openings, and means disposed within said tube openings for the sealing thereof, said means being of such character as to be readily removed therefrom.

In testimony that we claim the foregoing as our own, we have hereto affixed our signatures in the presence of two witnesses.

V. WARD GOULD.
CHARLES P. FIELD.

Witnesses:
L. B. HURD,
GERTRUDE E. SCOTT.